US012715746B2

(12) United States Patent
Son

(10) Patent No.: US 12,715,746 B2
(45) Date of Patent: Aug. 25, 2026

(54) PREFABRICATED FLOOR PLATE DEVICE OF STAND-UP REACH TRUCK

(71) Applicant: DOOSAN BOBCAT KOREA CO., LTD., Incheon (KR)

(72) Inventor: Jiwon Son, Incheon (KR)

(73) Assignee: DOOSAN BOBCAT KOREA CO., LTD., Incheon (KR)

(*) Notice: Subject to any disclaimer, the term of this patent is extended or adjusted under 35 U.S.C. 154(b) by 0 days.

(21) Appl. No.: 18/887,822

(22) Filed: Sep. 17, 2024

(65) Prior Publication Data

US 2025/0162848 A1 May 22, 2025

(30) Foreign Application Priority Data

Nov. 21, 2023 (KR) ........................ 10-2023-0162773

(51) Int. Cl.
*B66F 9/075* (2006.01)

(52) U.S. Cl.
CPC .................................. *B66F 9/0759* (2013.01)

(58) Field of Classification Search
CPC ..................................................... B66F 9/0759
See application file for complete search history.

(56) References Cited

U.S. PATENT DOCUMENTS

| | | | |
|---|---|---|---|
| 2011/0037039 A1 | 2/2011 | Li | |
| 2016/0244109 A1* | 8/2016 | Lohmann | B66F 9/0759 |
| 2020/0239291 A1 | 7/2020 | Lohmann et al. | |

FOREIGN PATENT DOCUMENTS

| | | | | |
|---|---|---|---|---|
| CN | 114436155 A * | 5/2022 | B66F 7/08 |
| EP | 1205427 B1 | 1/2005 | |
| EP | 3502041 A1 * | 6/2019 | B66F 9/07531 |
| EP | 3696134 A1 * | 8/2020 | B66F 9/0759 |
| KR | 20-1995-0018680 U | 7/1995 | |
| KR | 20-0128511 Y1 | 12/1998 | |
| KR | 20-0477961 Y1 | 8/2015 | |
| KR | 102502403 B1 * | 2/2023 | B66F 9/0759 |

OTHER PUBLICATIONS

The Extended European Search Report for the corresponding European Patent application No. 24202844.7 issued by the European Patent Office on May 3, 2025.
The Extended European Search Report for the corresponding European Patent application No. 24202844.7 issued by the European Patent Office on Mar. 5, 2025.
Office action from corresponding Korean Patent Application No. 10-2023-0162773 dated Jan. 19, 2026.

* cited by examiner

*Primary Examiner* — Diem M Tran
(74) *Attorney, Agent, or Firm* — Ladas & Parry, LLP

(57) ABSTRACT

A prefabricated floor plate device of a stand-up reach truck according to an embodiment of the present disclosure, which is provided to be attached to and detached from a stand-up reach truck, includes a floor plate provided on a floor of a driver plate provided in the stand-up reach truck, a vertical movement support coupled to a lower portion of the floor plate and configured to move up and down while supporting the floor plate, and a spring coupled to a lower corner portion of the floor plate and configured to elastically support the lower corner portion of the floor plate to absorb impacts or vibrations applied to the floor plate.

10 Claims, 3 Drawing Sheets

PREFABRICATED FLOOR PLATE DEVICE OF STAND-UP REACH TRUCK

CROSS-REFERENCE TO RELATED APPLICATION

This application claims the benefit of and priority to Korean Patent Application No. 10-2023-0162773, filed on Nov. 21, 2023 in the Korean Intellectual Property Office, the disclosure of which is incorporated herein by reference in its entirety.

BACKGROUND

1. Field

Embodiments of the present disclosure relate to a prefabricated floor plate device of a stand-up reach truck, and more specifically, to a prefabricated floor plate device of a stand-up reach truck which is provided to be attached to and detached from a stand-up reach truck and of which assembly and maintenance are easy and driving is stable.

2. Description of the Related Art

In general, reach trucks or fork lift trucks are industrial vehicles used to lift and transport heavy loads and are widely used when moving loads over short distances at construction sites or loading loads in indoor workplaces.

Among such reach trucks, in a stand-up reach truck, since a driver rides while standing up on a driver plate in the stand-up reach truck, the fatigue of a driver who stands up for a long time can be significantly accumulated due to vibrations or impacts of the vehicle generated during traveling.

Accordingly, conventionally, a simple elastic member such as rubber or a spring was installed on a floor plate to prevent the vibrations or impacts transmitted from the ground during the reach truck's traveling from being transmitted to the floor plate provided on a bottom of the driver plate.

In this regard, "Foot Cushion Device of Fork Lift TRUCK" was disclosed in Korean Registered Utility Model Publication No. 20-0128511 (hereinafter, referred to as Related Art 1).

Related Art 1 relates to a footrest cushion device of a stand-up fork lift truck in which a predetermined elastic member is disposed between a floor plate and a footrest of the fork lift truck to absorb vibrations transmitted from the ground during the fork lift truck's traveling and is a technology to improve work efficiency and protect a worker from various occupational diseases by relieving the fatigue felt by the worker by buffering and absorbing vibrations and impacts transmitted to the footrest from the ground during the fork lift trucks' traveling.

However, in Related Art 1, since a simple elastic member (coil spring) is installed below the footrest provided on a floor of the driver plate to absorb the vibrations and impacts transmitted to the footrest from the ground, there is a problem that the entire footrest is not moved and is shaken according to a position of the driver.

Meanwhile, conventionally, to prevent the vibrations or impacts transmitted from the ground during the reach truck's traveling from being transmitted to the floor plate as is, a shock absorber, cylinder guide, or the like was installed, and the floor plate and the like was manufactured using molds.

However, when the conventional shock absorber and the cylinder guide, and the like are installed and the floor plate and the like are manufactured using molds, there is a problem that convenience is degraded due to difficulty in assembly and maintenance, and there is a problem that a space for a driver is reduced because a wide space for installation is structurally required.

SUMMARY

Therefore, it is one aspect of the present disclosure to provide a prefabricated floor plate device of a stand-up reach truck of which installation convenience is improved because assembly is possible without manufacturing a mold.

It is another aspect of the present disclosure to provide a prefabricated floor plate device of a stand-up reach truck in which a floor plate and a vertical movement support are provided to be assembled to facilitate separation and maintenance and thus management convenience is improved.

It is still another aspect of the present disclosure to provide a prefabricated floor plate device of a stand-up reach truck in which a floor plate is only vertically moved by a vertical movement support coupled to a lower portion of the floor plate.

It is yet another aspect of the present disclosure to provide a prefabricated floor plate device of a stand-up reach truck in which a spring elastically supports a lower corner portion of a floor plate to minimize the shaking occurring due to the movement of a driver during traveling and enable stable driving.

It is yet another aspect of the present disclosure to provide a prefabricated floor plate device of a stand-up reach truck which is installed in a low height space so that a driver's space is sufficiently secured because a spring is coupled to a lower corner portion of a floor plate.

In accordance with one aspect of the present disclosure, a prefabricated floor plate device of a stand-up reach truck, which is provided to be attached to and detached from a stand-up reach truck, includes a floor plate provided on a floor of a driver plate provided in the stand-up reach truck, a vertical movement support coupled to a lower portion of the floor plate and configured to move up and down while supporting the floor plate, and a spring coupled to a lower corner portion of the floor plate and configured to elastically support the lower corner portion of the floor plate to absorb impacts or vibrations applied to the floor plate.

A first coupling hole may be formed in the floor plate so that the floor plate is coupled to the vertical movement support.

A second coupling hole corresponding to the first coupling hole may be formed in the vertical movement support so that the vertical movement support is coupled to the floor plate.

The floor plate and the vertical movement support may be provided to be assembled by a coupling part configured to couple the first coupling hole and the second coupling hole.

The vertical movement support may include an upper support member coupled to the lower portion of the floor plate to support the floor plate, a vertical movement member coupled to the upper support member and configured to move up and down to adjust a height of the upper support member, and a lower support member coupled to a lower portion of the vertical movement member to support the vertical movement member.

The second coupling hole corresponding to the first coupling hole may be formed in the upper support member so that the upper support member is coupled to the lower portion of the floor plate by the coupling part.

The vertical movement support may be provided in the form of a scissors lift to adjust a height of the floor plate.

The floor plate may be restricted to only vertically move by the vertical movement support.

The spring may be provided as a plurality of springs to be coupled to the lower corner portions of the floor plate, and the springs may be disposed at both sides of the vertical movement support with the vertical movement support disposed between the springs.

The prefabricated floor plate device may further include a lower plate coupled to a lower portion of the spring to support the spring.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
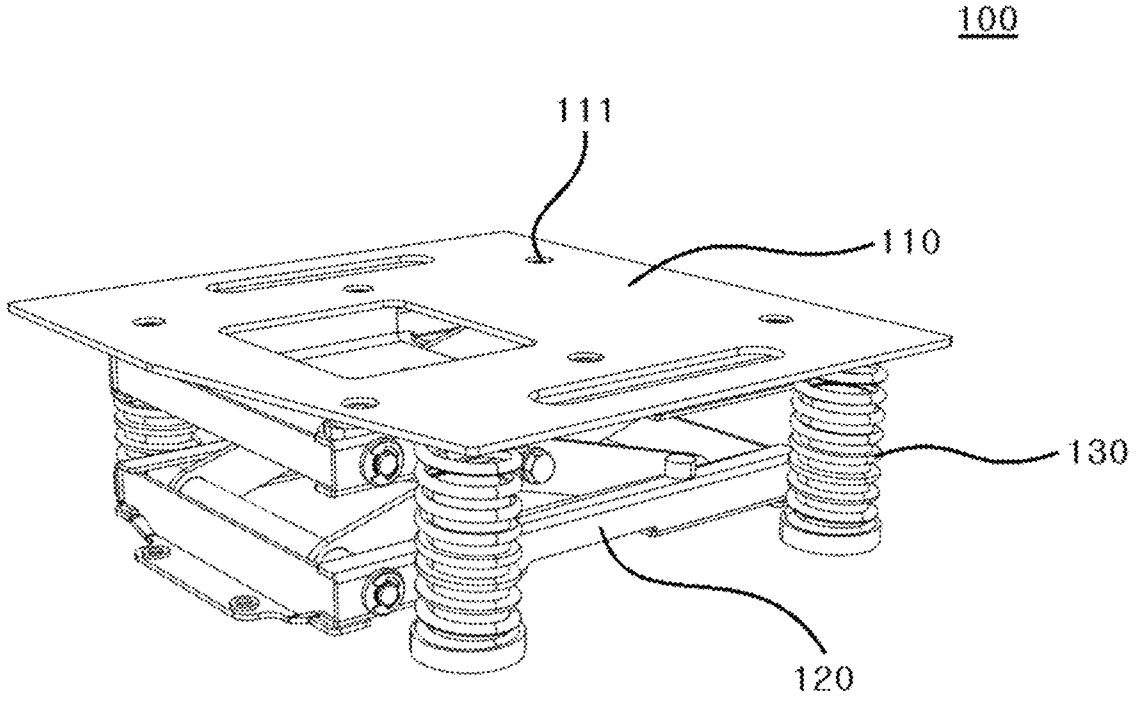
FIGS. 1 and 2 are views illustrating a prefabricated floor plate device of a stand-up reach truck according to a present embodiment.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and may be implemented in different forms. In the drawings, portions which are not related to the description may be omitted to clarify the present disclosure, and sizes of components may be exaggerated to facilitate understanding of the present disclosure.

Figure 2:
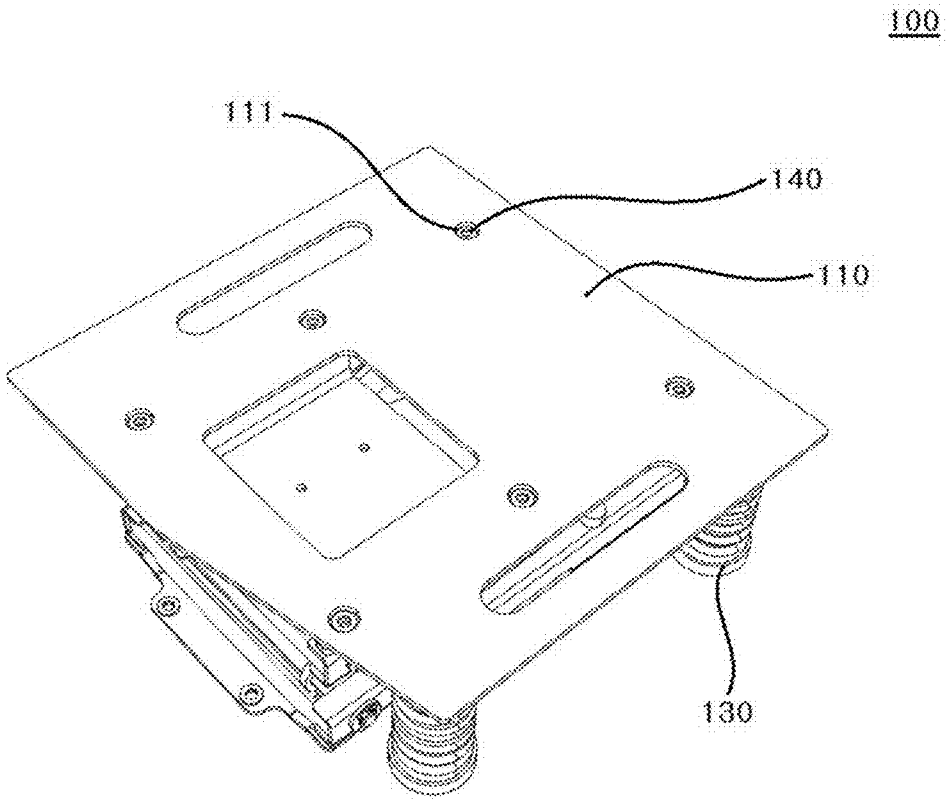
Figure 3:
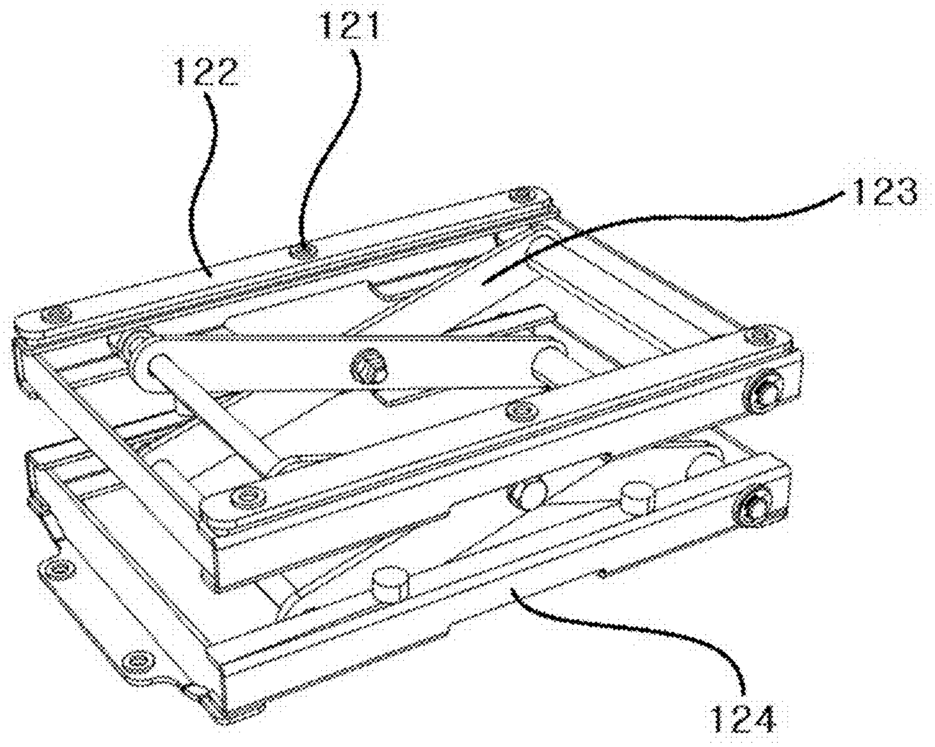
FIG. 3 is a view illustrating a vertical movement support of the prefabricated floor plate device of a stand-up reach truck according to the present embodiment.
Figure 4:
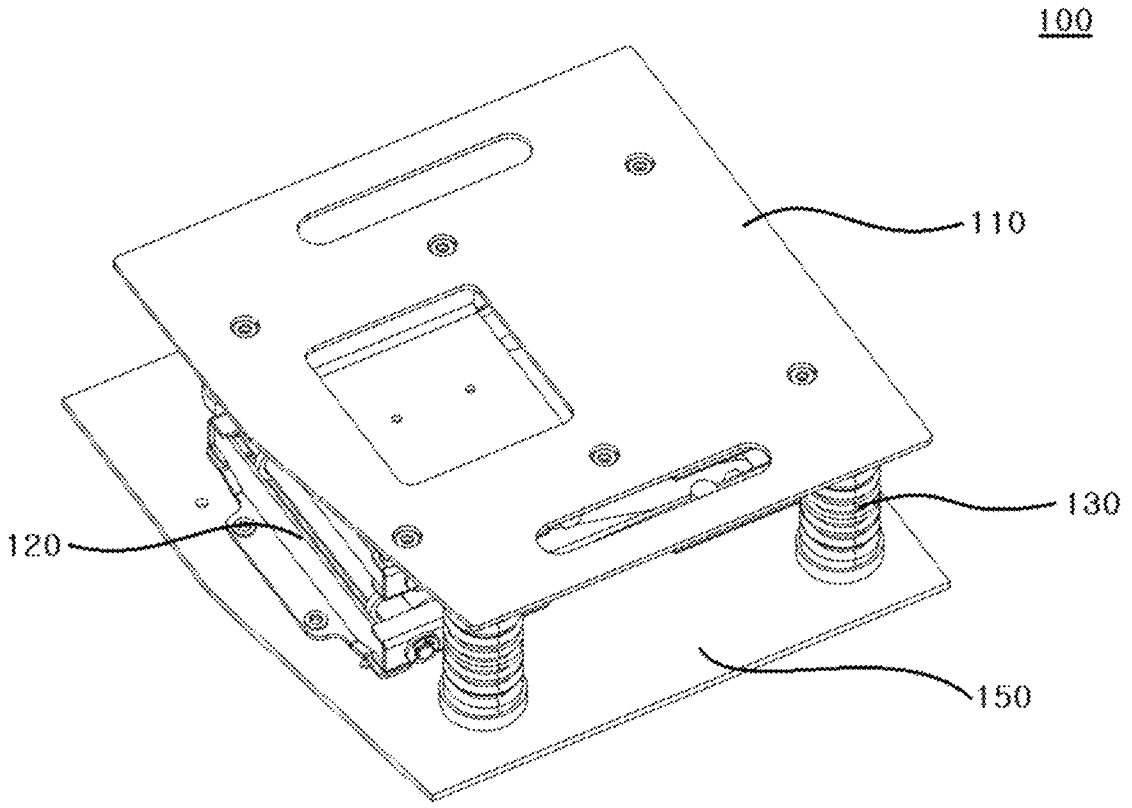
FIG. 4 is view illustrating the prefabricated floor plate device of a stand-up reach truck including a lower plate.

FIGS. 1 and 2 are views illustrating a prefabricated floor plate device of a stand-up reach truck according to a present embodiment, FIG. 3 is a view illustrating a vertical movement support of the prefabricated floor plate device of a stand-up reach truck according to the present embodiment, and FIG. 4 is view illustrating the prefabricated floor plate device of a stand-up reach truck including a lower plate.

Referring to FIGS. 1 to 4, a prefabricated floor plate device 100 of a stand-up reach truck according to the present embodiment is provided to be detachably attached to a stand-up reach truck and includes a floor plate 110 provided on a floor of a driver plate provided in the stand-up reach truck, a vertical movement support 120 which is coupled to a lower portion of the floor plate 110 and moves up and down while supporting the floor plate 110, and a spring 130 which is coupled to and elastically supports a lower corner portion of the floor plate 110 to absorb impacts or vibrations applied to the floor plate 110.

The prefabricated floor plate device 100 of a stand-up reach truck according to the present embodiment may be detachably installed on the floor of the driver plate of the stand-up reach truck.

The floor plate 110 is provided on the floor of the driver plate provided in the stand-up reach truck and may be formed of a material with superior durability to withstand a load of a driver and formed in a quadrangular shape.

A plurality of first coupling holes 111 for coupling to the vertical movement support 120 may be formed in the floor plate 110 by passing through the floor plate 110.

The vertical movement support 120 may be coupled to the lower portion of the floor plate 110 and may move the floor plate 110 up and down while supporting the floor plate 110.

A plurality of second coupling holes 121 corresponding to the first coupling holes 111 formed in the floor plate 110 may be formed in the vertical movement support 120 so that the vertical movement support 120 is coupling to the floor plates 110.

That is, the floor plate 110 and the vertical movement support 120 may be provided to be assembled by coupling parts 140 which couple the first coupling holes 111 and the second coupling holes 121. Here, the coupling parts 140 may be provided as screws or bolts, and nuts etc.

Meanwhile, the vertical movement support 120 may be provided in the form of a scissors lift capable of moving up or down to adjust a height of the floor plate 110 according to an embodiment.

That is, as the vertical movement support 120 is provided as a scissors lift capable of moving up or down, the height of the floor plate 110 can be flexibly adjusted to absorb impacts, vibrations, or the like during traveling.

Since the vertical movement support 120 is provided to move up and down in a state of being coupled to the lower portion of the floor plate 110, the vertical movement support 120 may restrict the floor plate 110 to only move vertically, and thus left-right movement of the floor plate 110 can be reduced.

Meanwhile, the vertical movement support 120 may include an upper support member 122 coupled to the lower portion of the floor plate 110 to support the floor plate 110, a vertical movement member 123 which is coupled to a lower portion of the upper support member 122 and moves up and down to adjust a height of the upper support member 122, and a lower support member 124 coupled to a lower portion of the vertical movement member 123 to support the vertical movement member 123.

That is, as the plurality of second coupling holes 121 corresponding to the plurality of first coupling holes 111 are formed in the upper support member 122, the upper support member 122 may be manufactured by being assembled with the floor plate 110 by the coupling parts 140.

In addition, the vertical movement member 123 may be provided in a form capable of moving up and down to adjust the height of the upper support member 122 and may be formed in an “X” shape according to an embodiment.

Accordingly, in the present disclosure, as the floor plate 110 and the vertical movement support 120 are provided so that assembly and maintenance are conveniently performed, installation and management convenience can be improved.

The spring 130 is coupled to the lower corner portion of the floor plate 110 to absorb impacts or vibrations applied to the floor plate 110 and to elastically support the floor plate 110.

The spring 130 may be provided as a plurality of springs 130, which are coupled to the lower corner portions of the floor plate 110, and the springs 130 may be provided at both sides of the vertical movement support 120 so that the vertical movement support 120 is disposed between the springs 130.

That is, when four springs 130 are provided according to an embodiment, the springs 130 may be coupled to the lower corner portions of the floor plate 110, and two springs 130 may be disposed at each of both sides of the vertical movement support 120 so that the vertical movement support is disposed between the springs 130.

Accordingly, in the present disclosure, when the driver stands on the floor plate 110, as the springs 130 are coupled to the lower corner portions of the floor plate 110 and the vertical movement support 120 is coupled to the lower portion of the floor plate 110, the vertical movement support 120 may stably elastically support the floor plate 110, and thus the fatigue of the driver can be minimized by reducing impacts due to a floor surface of the driver plate during traveling, and stable driving is enabled.

That is, since the present disclosure has a structure that allows the entire floor plate 110 to move no matter where the driver steps and stands on the floor plate 110, stability can be improved further when the user drives.

In addition, in the present disclosure, the height or a sagging amount of the floor plate 110 may be adjusted by adjusting the elastic coefficient of the spring 130, and damping sensibility or the like may also be adjusted.

Referring to FIG. 4, the prefabricated floor plate device 100 of a stand-up reach truck of the present disclosure may further include a lower plate 150 coupled to a lower portion of the spring 130 to support the spring 130.

As the lower plate 150 is coupled to the lower portion of the spring 130 to stably support the spring 130, shaking occurring due to movements of the driver due to vibrations or impacts during traveling can be minimized.

As described above, in the prefabricated floor plate device 100 of a stand-up reach truck according to the present embodiment, assembly and maintenance of the floor plate 110 and the vertical movement support 120 are easy due to the coupling parts 140, the floor plate 110 is restricted to only vertically move by the vertical movement support 120, and the spring 130 elastically supports the lower corner portion of the floor plate 110. Accordingly, shaking occurring due to movements of the driver during traveling can be minimized, and stable driving is enabled.

In addition, in the prefabricated floor plate device 100 of a stand-up reach truck according to the present embodiment, as the spring 130 is coupled to the lower corner portion of the floor plate 110, the prefabricated floor plate device 100 of a stand-up reach truck can be installed in a low height space to sufficiently secure a space of the driver.

In a prefabricated floor plate device of a stand-up reach truck according to the present embodiment, since assembly is possible without manufacturing a mold, installation convenience can be improved.

In a prefabricated floor plate device of a stand-up reach truck according to the present embodiment, since a floor plate and a vertical movement support are provided to be assembled, separation and maintenance are easy, and thus management convenience can be improved.

In a prefabricated floor plate device of a stand-up reach truck according to the present embodiment, a floor plate can be only vertically moved by a vertical movement support coupled to a lower portion of the floor plate.

In a prefabricated floor plate device of a stand-up reach truck according to the present embodiment, since a spring elastically supports a lower corner portion of a floor plate, impacts due to a floor surface of a driver plate during traveling can be reduced to minimize the fatigue of a driver and enable stable driving In a prefabricated floor plate device of a stand-up reach truck according to the present embodiment, since a spring is coupled to a lower corner portion of a floor plate, the prefabricated floor plate device can be installed in a low height space, and thus a driver's space can be sufficiently secured.

What is claimed is:

1. A prefabricated floor plate device of a stand-up reach truck, being attachable to and detachable from the stand-up reach truck, the prefabricated floor plate device comprising:

a floor plate provided on a floor of a driver plate provided in the stand-up reach truck;

a vertical movement support coupled to a lower portion of the floor plate and configured to move up and down while supporting the floor plate; and a spring coupled to a lower corner portions of the floor plate and configured to elastically support the lower corner portions of the floor plate to absorb impacts or vibrations applied to the floor plate, wherein the spring comprises four spring members respectively coupled to the four lower corner portions of the floor plate, and wherein the spring is configured such that an elastic coefficient thereof is adjustable to control a height, a sagging amount, and a damping force of the floor plate.

2. The prefabricated floor plate device of claim 1, wherein a first coupling hole is formed in the floor plate so that the floor plate is coupled to the vertical movement support.

3. The prefabricated floor plate device of claim 2, wherein a second coupling hole corresponding to the first coupling hole is formed in the vertical movement support so that the vertical movement support is coupled to the floor plate.

4. The prefabricated floor plate device of claim 3, wherein the floor plate and the vertical movement support are provided to be assembled by a coupling part configured to couple the first coupling hole and the second coupling hole.

5. The prefabricated floor plate device of claim 4, wherein the vertical movement support includes:

an upper support member coupled to the lower portion of the floor plate to support the floor plate;

a vertical movement member coupled to the upper support member and configured to move up and down to adjust a height of the upper support member; and a lower support member coupled to a lower portion of the vertical movement member to support the vertical movement member.

6. The prefabricated floor plate device of claim 5, wherein a second coupling hole corresponding to the first coupling hole is formed in the upper support member so that the upper support member is coupled to the lower portion of the floor plate by the coupling part.

7. The prefabricated floor plate device of claim 1, wherein the vertical movement support is provided in a form of a scissors lift to adjust a height of the floor plate.

8. The prefabricated floor plate device of claim 7, wherein the floor plate is restricted to only vertically move by the vertical movement support.

9. The prefabricated floor plate device of claim 1, wherein the spring members are disposed at both sides of the vertical movement support with the vertical movement support disposed between the spring members.

10. The prefabricated floor plate device of claim 1, further comprising a lower plate coupled to a lower portion of the spring to support the spring.

* * * * *